March 14, 1961

D. B. KASCHNER, SR 2,974,953

GAUGING MECHANISM

Filed Feb. 17, 1960

INVENTOR.
DANIEL BERNARD KASCHNER SR.
BY
George P. Ziehmer Jr.
AGENT

March 14, 1961  D. B. KASCHNER, SR  2,974,953
GAUGING MECHANISM
Filed Feb. 17, 1960  2 Sheets-Sheet 2
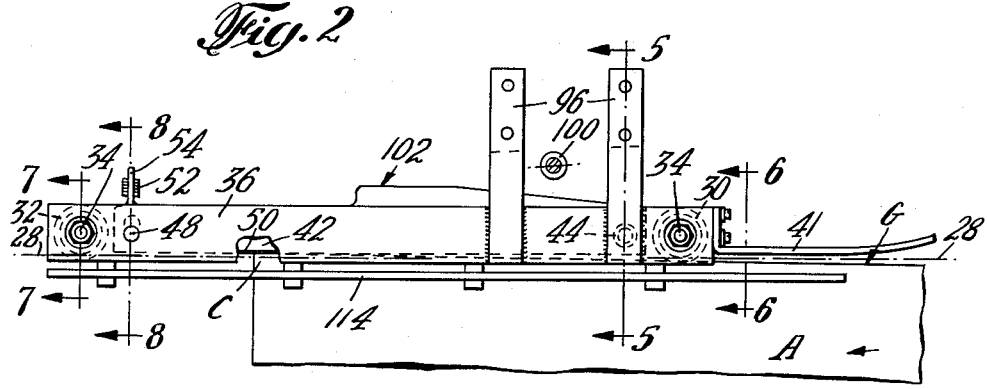
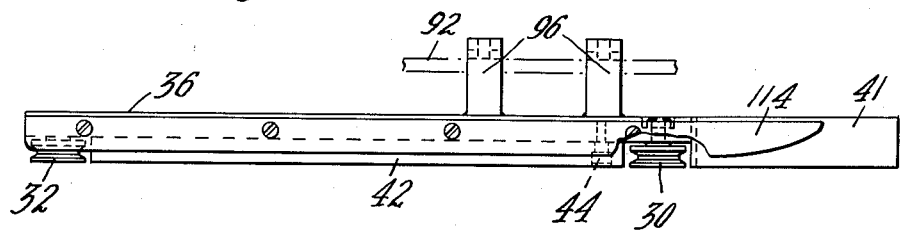
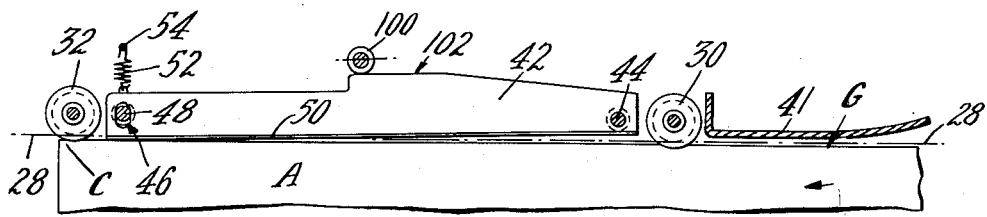
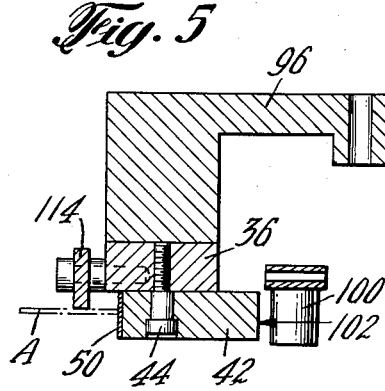
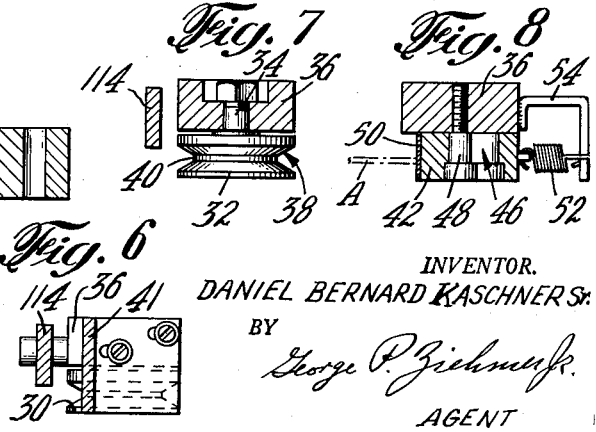
INVENTOR.
DANIEL BERNARD KASCHNER Sr.
BY
George P. Ziehmer Jr.
AGENT

United States Patent Office 2,974,953
Patented Mar. 14, 1961

2,974,953

GAUGING MECHANISM

Daniel Bernard Kaschner, Sr., Lombard, Ill., assignor to American Can Company, New York, N.Y., a corporation of New Jersey Filed Feb. 17, 1960, Ser. No. 9,251

10 Claims. (Cl. 271—59)

The present invention relates to gauging mechanisms for gauging flat sheets as they are fed along a feed table in a straight line path of travel and has particular reference to such a mechanism which is provided with means to deflect the adjacent leading corners of the incoming sheets from engagement with stationary gauge means disposed at one side of the feed table.

In many industries wherein production machines such as slitters, coaters, or presses operate upon flat sheets of metal during the manufacturing process, it is necessary that very accurate gauging of the sheet be obtained in order to prevent misregistry of the sheets and the consequent spoilage of the product. One method of doing this is to press one side edge of the sheet against two gauging elements, which usually take the form of rollers, disposed in longitudinally spaced alignment along the side of the feed table, to thereby obtain the proper lateral registration of the sheets. The co-tangential line along which the side edges of the sheets contact the two spaced gauging rollers may be designated as the gauge line, and it will be obvious that in thus gauging sheets at high speeds, it is essential that they be fed into the gauging station of the machines with their side edges as closely aligned with this gauge line as possible, in order that the lateral movement necessary to bring the sheet edges into contact with the gauge rollers be held to a minimum.

In order to permit this to be done, these gauging rollers are frequently mounted on movable carriers which bring the rollers up to the gauge line for the gauging operation and move the rollers outwardly from the gauge line after the gauging has been completed in order to facilitate the feeding of the next sheet into the gauging station without obstruction from these gauge rollers. One example of such a device is disclosed in Nordquist Patent 2,490,085 wherein each of these side gauging element is mounted on a chain which is disposed at an angle to the gauge line so that the gauge elements are in retracted position as the sheet is fed into the gauging station but are gradually moved inwardly toward the sheet so that at the time the gauging operation takes place, the gauge elements are located on the gauge line.

Another type of gauging mechanism utilizing retractable gauge elements is disclosed in U.S. Patent 2,355,079 issued on August 8, 1944 to L. L. Jones. This patent discloses a gauging mechanism wherein the two side gauging rollers are mounted on a reciprocating bar which moves the rollers up to the gauge line for the gauging operation, and then retracts them to permit the succeeding sheet to unobstructedly enter the gauging station.

The just described devices, when properly maintained, provide excellent results and permit the side edges of the sheets to be disposed either inwardly or outwardly of the gauge line as the sheets enter the gauging station. Such mechanisms, however, do have the disadvantage, which always holds true where moving parts are utilized, in that there is increased opportunity for wear to take place and for the parts to get out of adjustment so that frequent adjustment is necessary in order to obtain the desired results.

To overcome this disadvantage, gauging devices have been developed wherein the two lateral gauge rollers are fixedly mounted so that the opportunity for disadjustment is decreased and the cost of maintenance is reduced. However, when fixed gauge rollers are utilized, a new problem arises in that care must be taken to insure that the leading corner of each sheet does not strike against either of the gauging rollers as the sheet enters the gauging station.

Heretofore, this problem has been solved by locating the sheet edge nearest the gauge rollers, which edge will hereafter be referred to as the gauge edge, a considerable distance inwardly of the gauge line prior to the time the sheet enters the gauging station, and then moving the sheet laterally into engagement with the gauging rollers after its adjacent front corner has passed them. This is a practical solution at low speeds, since there is then adequate time in order to gently shift the sheet laterally an appreciable distance to bring it into contact with the gauge rollers. At high speeds, however, this cannot be done, since there is so little time in which to effect the lateral shifting of the sheet that a very rapid lateral acceleration of the sheet is required, and the sheet is either nicked or distorted as a consequence of its rapid lateral acceleration.

The instant invention provides the answer to this problem by making it possible to feed the sheets into the gauging station with their side edges spaced just inwardly of the gauge line and as close to the gauge line as possible without actually permitting their adjacent front corners to strike against the gauge rollers. To obtain this result, the invention contemplates the utilization of some form of a pregauging station, disposed as close as possible to the first gauge roller in order to pre-position the sheets so that they clear this first gauge roller as they enter the main gauging station. This alone is not sufficient, however, since due to the normal vibrations encountered in the machine, and for other reasons, the sheets frequently are jiggled in such manner that they shaft position after passing the first gauge roller but before they reach the second gauge roller. Frequently, this jiggling results in the leading corner of a sheet moving outwardly beyond the gauge line, in which position it would strike against the second gauge roller when it reached it. To prevent this, applicant has provided a deflector element which is disposed between the first and second gauge rollers and is movable to a position wherein its deflecting surface is disposed inwardly of the gauge line as the sheet corner approaches the second gauge element so that the sheet, if it has moved outwardly beyond the gauge line, is deflected inwardly of it and thus is prevented from contacting the second gauge roller.

This deflector element is preferably cam actuated into its inwardly disposed, deflecting position but is movable outwardly beyond the gauge line after the adjacent sheet corner has passed the second gauge roller to thereby permit the sheet to be moved laterally into contact with both of the gauge rollers for the gauging operation without interference from the deflecting element. The deflector element is preferably maintained in this outward, non-deflecting position until the gauged sheet has been removed from the gauging station, after which the deflector element is again cammed into deflecting position in order to insure that the adjacent leading corner of the succeeding sheet similarly enters the gauging station without contacting the second gauge roller.

As a result of this construction, applicant has provided a two-point side gauging mechanism which is very simple in construction and completely reliable in operation.

An object of the invention therefore is the provision of a gauging mechanism of simple construction which is adapted to provide two point side gauging of metal sheets at high speeds by means of stationary gauge rollers fixedly mounted on one side of the feed table.

Another object of the invention is the provision of such a gauging mechanism wherein two stationary gauge elements are disposed at one side of the gauging station, and means are provided to permit the sheets to be fed into the gauging station at high speeds in closely spaced relation to the gauge elements while at the same time preventing undesirable premature contact between the sheets and the gauge elements.

A further object is the provision in a gauging machine of a cam-actuated deflector element positioned just in advance of at least one of the gauge elements to guide the adjacent sheet corners past the gauge element without permitting them to hit against the gauge element.

Numerous other objects and advantages of the invention will be apparent as it is better understood from the following description, which, taken in connection with the accompanying drawings, discloses a preferred embodiment thereof.

Referring to the drawings:

Fig. 2 is a plan view on an enlarged scale of the two side gauging rollers and the sheet deflecting device associated therewith, parts being omitted for the sake of clarity of illustration;

Fig. 3 is a side elevation of the mechanism of Fig. 2 with parts being broken away;

Figure 1:
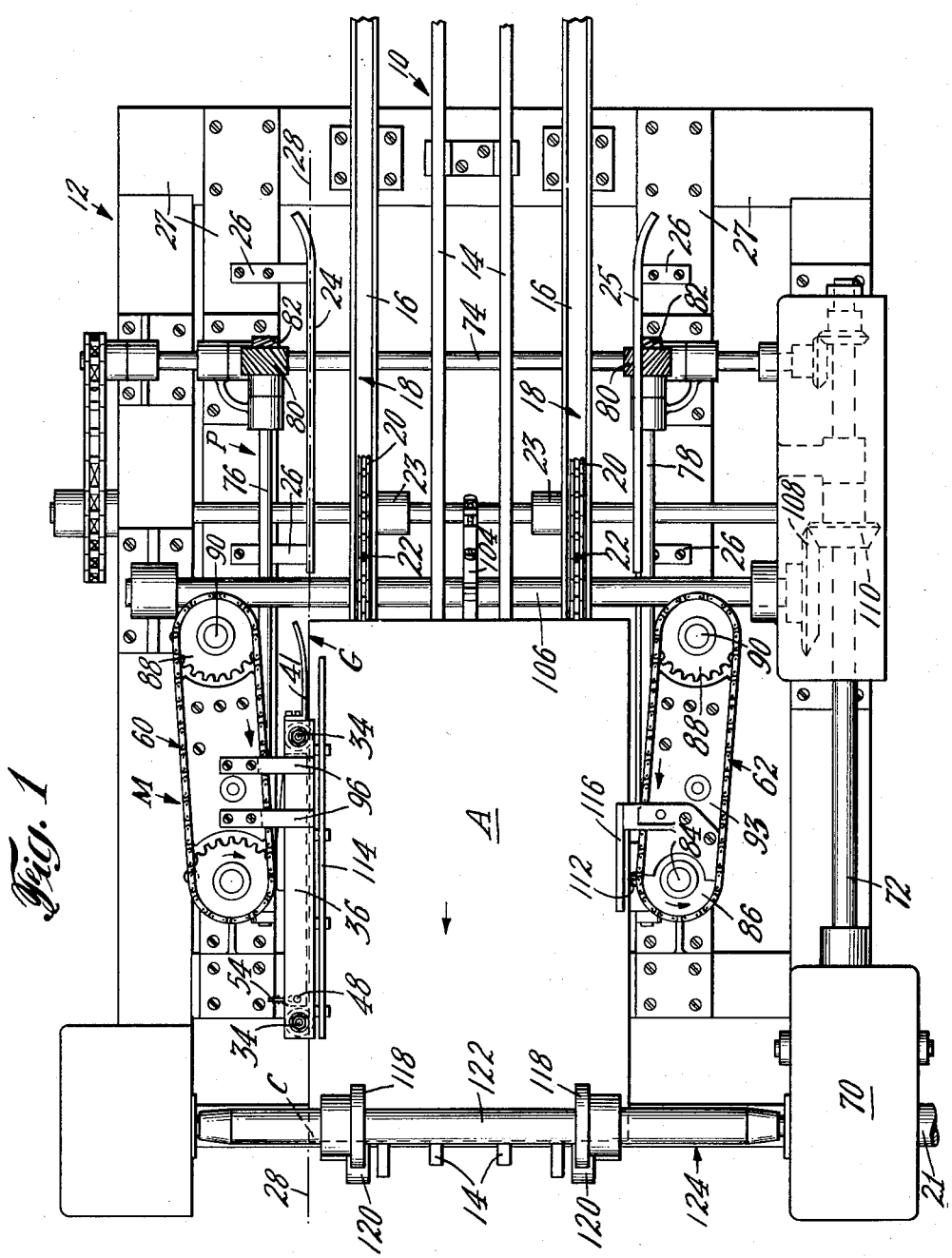
Figure 1 illustrates a plan view of the mechanism embodying the instant invention; the deflecting mechanism being shown in retracted, non-deflecting position; parts being broken away.

Fig. 4 is a view similar to Fig. 2 but showing the deflector element cammed inwardly to deflecting position; and Figs. 5, 6, 7, and 8 are sectional details on an enlarged scale taken along the lines 5—5, 6—6, 7—7 and 8—8 respectively of Fig. 2.

As a preferred and exemplary embodiment of the instant invention the drawings illustrate the gauging mechanism of the instant invention as incorporated in a sheet feeding and gauging machine which embodies many of the parts of the machines shown and described in United States Patents 2,488,551 and 2,490,085 which issued to R. E. J. Nordquist and B. A. Baumann and were assigned to the instant assignee. It will be understood that this sheet feeding and gauging machine may form a part of a production machine which performs some manufacturing operation upon the sheets, such as coating, slitting or printing.

As best seen in Fig. 1, the sheets A to be gauged are fed in continuous, evenly spaced longitudinal procession along the feed table 10 of a feeding and gauging machine 12. Only one such sheet is shown in the drawings in order to clarify the operation of the machine. The feed table 10 comprises a pair of flat inner support rails 14 and a pair of outer support rails 16, the latter rails being formed with guide grooves 18 in which a pair of endless feed chains 20 operate.

The feed chains 20 carry pairs of laterally aligned feed dogs 22 which extend upwardly above the top surfaces of the rails 16 and engage the rear edges of the sheets A to propel them along the feed table 10. The chains 20 operate around suitable front and rear sprockets (not shown) and are driven from the main drive shaft 21 of the machine by a pair of bottom sprockets 23 in a manner clearly shown in the previously mentioned Patents 2,485,551 and 2,490,085.

The sheets A are received on the feed table 10 from any suitable source and, as they are propelled from the front end of the machine 12 (at the right, as seen in Fig. 1) they are passed through the pregauging station P which comprises a pair of spaced guide bars 24, 25 which are mounted on brackets 26 bolted to the frame 27 of the machine 12. The guide bars 24, 25 are disposed at the feed level of the feed table 10 and spaced apart a distance which is only slightly (preferably about ⅛") in excess of the width of the sheet, and are provided with curved lead-in portions to receive the sheets and gently move them laterally into position to enter between the guide bars 24, 25 if such action be necessary.

The inner guide surface of the guide bar 24, which bar is disposed on the gauging side of the feed table, is positioned slightly inwardly of the imaginary gauge line of the machine, which line is shown in the drawings as the dot and dash line 28. As a result, the edges of the sheets A adjacent this guide bar 24, which edges will be hereinafter referred to as the gauge edges G, are pregauged to a position which is definitely inwardly of, although close to, the gauge line 28.

The main gauging station M is positioned just beyond the pregauging station P and comprises a first gauge roller 30 and a second gauge roller 32, both of which are rotatably mounted on studs 34 which are carried by a stationary support bar 36. The gauge rollers 32, 34 are each formed with a groove 38 which receives the gauge edges G of the sheets A. The bottom portion of each groove 38 is formed with a vertical annular gauging surface 40 which is disposed tangentially to the gauge line 28 and actually contacts the gauge edges G of the sheets A to effect the desired lateral gauging of the sheets A.

The first gauge roller 30 is spaced so closely to the pregauging station P that there is very little chance that the adjacent front corner C of the sheet A will shift outwardly beyond the gauge line 28 by the time it reaches the roller 30. However, it is desirable to affix a stationary guard 41 to one end of the support bar 36 with its inner vertical surface disposed just outwardly of the gauge line 28 as a precautionary measure in the event that the sheet A is somehow subjected to forces which would tend to skew it around abnormally. In such event, the guard 41 would limit the skewing action and minimize the possibility of a jam in the machine.

The second gauge roller 32 is, in contrast to the roller 30, spaced a considerable distance from the pre-gauging station P. As a result, the probabilities are immeasurably greater that the sheet corner C will be shifted outwardly beyond the gauge line 28 by the time it reaches the roller 32. Since even minor contact between the sheet corner C and the roller 32 is extremely undesirable, a movable deflector bar 42 is provided in order to insure that each sheet corner C is disposed inwardly of the gauge line 28 when it passes the gauge roller 32. The deflector 42 is carried by the support bar 36, one end of the deflector 42 being pivotally mounted on a stud 44 which depends from the support bar 36 adjacent the first gauge roller 30, the other end of the deflector 42 being formed with a slot 46 in which is positioned a stop pin 48, carried by the bar 36, to limit the pivotal movement of the deflector 42.

The deflector bar 42 is provided with an inner deflecting surface 50 which preferably comprises a piece of hard, wear resistant material, and is normally held in outward, nondeflecting position beyond the gauge line 28 by a spring 52, one end of which is secured to the deflector 42 and the other which is hooked over a bracket 54 which is carried by the support bar 36.

The gauging mechanism at the main gauging station M also includes two sets of endless chain conveyors 60, 62, each of which comprises a pair of vertically spaced upper and lower endless chains which are horizontally mounted at a slight angle to the forward path of travel of the sheets A. The details of construction of these chain conveyors are clearly described in the aforementioned Nordquist and Baumann Patent 2,488,581.

As seen in Fig. 1, the conveyors 60, 62 are driven from the main drive shaft 21 in such manner that the inner flights of the chains travel in the direction of travel of the sheets A as they pass through the machine. The rotation of the main drive shaft 21 is transmitted to the conveyors 60, 62 by means of a gear box 70, which imparts the required rotary motion to a longitudinal shaft 72, which in turn rotates a cross-shaft 74. The rotation of the cross-shaft 74 is imparted to a pair of longitudinal shafts 76, 78 through meshing sets of helical gears 80, 82, and in turn, the rotation of longitudinal shafts 76, 78 is transmitted to a pair of short vertical shafts 84 by suitable helical gears (not shown) which are similar to the gears 80, 82. The shafts 84 carry drive sprockets 86 which drive the chain conveyors 60, 62. At their other ends, the chain conveyors 60, 62 are carried by idler sprockets 88 which are mounted on short idler shafts 90.

The chain conveyors 60, 62 also operate around stationary chain guide plates 92, 93, respectively, which plates are secured to the machine frame 27. The plate 92 carries the stationary support bar 36 which is fixedly mounted thereon by means of a pair of support brackets 96 which are bolted to the plate 92.

As each sheet A is conveyed along the feed table 10 by the feed dogs 22, its front corner C passes the first gauge roller 30 without striking it as hereinbefore explained. However, frequently the vibration of the machine causes the sheet A to shift on the feed table 10 so that its front corner moves outwardly beyond the gauge line 28 before it passes the second gauge roller 32. This condition may best be seen in Fig. 2. In order to prevent a thus mispositioned corner C from striking against the second gauge roller 32, the deflector 42 is moved inwardly to deflect the sheet corner C inwardly of the gauge line 28. This inward movement of the deflector bar 42 is effected by the engagement of a cam roller 100 against a cam surface 102 which is formed on the outside of the deflector 42.

The cam roller 100 is mounted on the endless chain conveyor 60 in a manner described in the previously mentioned Nordquist and Baumann Patent 2,488,551, and is so positioned thereon relative to the chain feed dogs 22 that it engages the cam surface 102 to move the deflector 42 to its inward, deflecting position prior to the time this sheet corner C reaches the second gauge roller 32. The cam surface 102 is of sufficient length to maintain the deflector 42 in its inward deflecting position until such time as the sheet corner C passes the second gauge roller 32, as seen in Fig. 4. Shortly thereafter, the continued movement of the endless chain conveyor 60 causes the cam roller 100 to ride off the cam surface 102, thus permitting the spring 52 to pull the deflector 42 to its outward position wherein its deflecting surface 50 is disposed beyond the gauge line 28, in which position it is completely out of contact with the gauge edge G of the sheet A so that it does not interfere with the final gauging operation. If desired, the spring 52 may be omitted, and the deflector moved outwardly by the sheet itself during the final gauging operation, which will now be described.

When the front sheet corner C has safely passed the second gauge roller 32, the final gauging operation takes place. As a part of this gauging operation, the sheet is advanced slightly ahead of the chain feed dogs 22 by a single rotary back gauge 104 which comprises an arm keyed to a shaft 106 which is rotated in time with the other moving parts of the machine from the shaft 72 by means of a pair of bevel gears 108, 110. The rotary back gauge 104, which is preferably of the type disclosed in the previously mentioned Patent 2,488,551, is disposed so that it engages the rear edge of the sheet A closely adjacent its longitudinal center.

After the back gauge 104 has taken over the advancement of the sheet A, the latter is gently moved laterally of the feed table 10 into engagement with the side gauge rollers 30, 32 by a roller 112 which is yieldably mounted on and carried by the endless chain conveyor 62 and is so positioned thereon that it engages the sheet approximately mid-way between its ends.

As will be seen from Fig. 1, the chain conveyor 62 is disposed at an angle to the path of travel of the sheet A, and its inner flight moves at a forward speed substantially equal to the forward speed of the sheet A. As a result, when the sheet A first enters the main gauging station M, the roller 112 is disposed outwardly beyond the adjacent edge of the sheet A, but, as both the sheet A and the roller 112 advance, the roller 112 moves inwardly into gentle contact with the sheet A and moves it laterally until it reaches the finally gauged position of Fig. 1 wherein its gauge edge G contacts both of the gauge rollers 30, 32. At such time, the sheet A is subjected to a three point gauging operation, two of the gauge points being provided by two side gauge rollers 30, 32 and the third gauge point being provided by the rear gauge 104. Suitable sheet hold-down bars 114, 116 are provided adjacent both side edges of the sheet. These bars normally do not engage the sheets A, but are spaced closely above their upper surfaces in order to eliminate any tendency of the sheet to move upwardly during the gauging operation.

At the moment the final gauging operation takes place, the sheet A occupies the position shown in Fig. 1 of the drawing. At such time the leading edge of the sheet is disposed between two pairs of cooperating feed rollers 118, 120 which are mounted respectively on shafts 122, 124, the shafts 122, 124 being continuously driven from the main drive shaft 21 by means of suitable gears carried in the gear box 70.

Up to the time the sheet reaches the position of Fig. 1, the upper shaft 122 is held in raised position relative to the shaft 124 by rotary cams which are carried by the lower shaft 124. As a result, the rollers 118, 120 are held in vertically spaced relationship and do not grip the sheet A. However, immediately upon completion of the final gauging operation the cams which keep the shafts, and consequently rollers 118, 120, separated, rotate to non-operative position, thus permit the upper rollers 118 to move downwardly. As a result, the rollers 118, 120 close upon the gauged sheet A and advance it from the final gauging station M in gauged position into the operating portion of the machine (not shown).

It will be understood that various modifications may be utilized without departing from the scope of the invention. As an example, if it is not desirable to pregauge the sheets just ahead of the first gauge roller 30, a second deflector similar in construction and operation to deflector 42 could be utilized to deflect the sheets away from the first roller 30.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. A sheet gauging mechanism, comprising in combination, a feed table, means for feeding a sheet along said feed stable, a side gauge fixedly mounted on one side of said feed table, shifting means for moving said sheet laterally of said feed table to bring it into engagement with said side gauge, and deflector means disposed ahead of and adjacent to said side gauge, said deflector means being movable to a position inwardly of said side gauge to deflect said sheet inwardly of said side gauge to thereby guide its adjacent front corner past said side gauge without striking against the same, said deflector means being movable outwardly after said adjacent sheet corner has passed said side gauge to enable said shifting means to move said sheet into contact with said side gauge.

2. The mechanism of claim 1 wherein said deflector means is cammed to its position inwardly of said side gauge.

3. The mechanism of claim 2, wherein said deflector means is moved outwardly by spring means.

4. The mechanism of claim 2, wherein said deflector means comprises a pivotally mounted deflector element.

5. A sheet gauging mechanism, comprising in combination, a feed table, a first and second side gauging element fixedly mounted on one side of said feed table in spaced longitudinal relationship therealong, means for feeding a sheet along said feed table past said first and second side gauging elements, shifting means for moving said sheets laterally on said feed table after its adjacent front corner has passed said first and second gauging elements to bring a side edge of said sheet into contact with said side gauging elements to effect a side gauging operation, means for initially positioning said sheet on said feed table with its adjacent front corner disposed inwardly of said first gauging element, said means being effective to insure that said adjacent sheet corner passes inwardly of said first gauging element without striking against it, and deflector means disposed between said gauging elements, said deflector means being movable inwardly of said second gauging element to deflect said adjacent sheet corner inwardly of said second gauge element in the event said adjacent sheet corner inadvertently moves outwardly after it passes said first gauging element, said deflector means being movable outwardly after said adjacent sheet corner passes said second gauge element to enable said shifting means to move said sheet laterally without interference from said deflector means.

6. The mechanism of claim 5 wherein said first and second gauging elements comprise a pair of longitudinally spaced gauge rollers.

7. The mechanism of claim 6 wherein cam means are provided to move said deflector means inwardly of said second gauge roller prior to the time said adjacent sheet corners reaches said second gauge roller to thereby deflect said sheet corner inwardly in the event it has moved outwardly beyond said second gauge roller subsequently to the time it passes said first gauge roller.

8. The mechanism of claim 7, wherein said sheet feeding means include a back gauge engageable against a rear edge of said sheet while said side gauging operation takes place to provide front-to-back gauging of said sheet.

9. The mechanism of claim 8, wherein said back gauge makes single point contact with the rear edge of said sheet.

10. A sheet gauging mechanism, comprising in combination, a feed table, a first and a second side gauge roller fixedly mounted on one side of said feed table in spaced longitudinal relationship therealong, means for feeding a sheet along said feed table past said first and second gauge rollers, shifting means for moving said sheet laterally on said feed table after its front corner on the side adjacent said gauge rollers has passed both of said gauge rollers, pregauging means disposed on said feed table and extending closely adjacent said first gauge roller for positioning said sheet on said feed table so that its said front corner is disposed inwardly of said first gauge roller when it passes said first gauge roller, deflector means disposed between said gauge rollers adjacent said second gauge roller, and means for moving said deflector means inwardly of said second gauge roller to thereby deflect said front sheet corner away from said second gauge roller in the event it inadvertently moves outwardly after it passes said first gauge roller, said deflector means being movable to a non-deflecting position after said front sheet corner passes said second gauge roller to enable said shifting means to move said sheet laterally without interference from said deflector means.

References Cited in the file of this patent

UNITED STATES PATENTS

| | | |
|---|---|---|
| 2,072,121 | Montgomery | Mar. 2, 1937 |
| 2,830,814 | Nordquist | Apr. 15, 1958 |